United States Patent [19]

Advani et al.

[11] Patent Number: 4,477,880

[45] Date of Patent: Oct. 16, 1984

[54] METHOD FOR COMBINING PROGRAM DISKETTES IN AN INTERACTIVE TEXT PROCESSING SYSTEM

[75] Inventors: Hira Advani; William C. Cason; Gerald E. Hayes, all of Austin, Tex.

[73] Assignee: International Business Machines Corporation, Armonk, N.Y.

[21] Appl. No.: 311,083

[22] Filed: Oct. 13, 1981

[51] Int. Cl.³ .............................................. G06F 1/00
[52] U.S. Cl. ..................................... 364/900; 364/300
[58] Field of Search ... 364/200 MS File, 900 MS File, 364/300, 200, 900

[56] References Cited

U.S. PATENT DOCUMENTS 3,913,721 10/1975 Koplow et al. ...................... 364/900
4,100,607 7/1978 Skinner .............................. 364/900
4,213,179 7/1980 Hammano et al. .................. 364/900
4,250,560 2/1981 Dethloff et al. .................... 364/900

OTHER PUBLICATIONS

Kolya, DosPlus: Double-Density Operating System for the TRS-80, BYTE, Jul. 1981, pp. 334-343.

Kelly, Percom's Doubler, BYTE, Jul. 1981, pp. 344-352.

Primary Examiner—Gareth D. Shaw
Assistant Examiner—Daniel K. Dorsey
Attorney, Agent, or Firm—Richard E. Cummins

[57] ABSTRACT

A method is disclosed for improving the efficiency of an operator of an interactive text processing system in which a plurality of different text processing task programs are each stored on a different single-sided, single-density (1S1D) diskette so that in the creation and use of a text document involving several different tasks, the operator's efficiency is decreased due to the time involved in inserting and removing each required diskette. The method involves creating a combined program diskette on a two-sided, double-density (2S2D) diskette by sequentially transferring program modules for interactively selected text processing task programs from corresponding 1S1D diskettes under the control of a "Combine" program. The method provides one 2S2D combined text processing program diskette containing all the programs necessary to create and use a specific text document by means of the selected tasks.

13 Claims, 6 Drawing Figures

| 0 | LENGTH OF DIRECTORY (IN BYTES) | MAX. MODULE # FOR DATA | RESERVED | RESERVED | RESERVED |
|---|---|---|---|---|---|
| 6 | ATTRIBUTES OF MODULE 1 | LENGTH OF MODULE 1 (IN BYTES) | | PHYSICAL BLOCK NUMBER OF MODULE 1 | |
| 12 | — — — — — — — — — — — — | | | | |
| 762 | ATTRIBUTES OF MODULE 127 | LENGTH OF MODULE 127 (IN BYTES) | | PHYSICAL BLOCK NUMBER OF MODULE 127 | |
| 768 | BUILD NUMBER OF MODULE 1 | BUILD NUMBER OF MODULE 2 | | BUILD NUMBER OF MODULE 3 | |
| 774 | BUILD NUMBER OF MODULE 4 | BUILD NUMBER OF MODULE 5 | | BUILD NUMBER OF MODULE 6 | |
| | — — — — — — — — — — — — | | | | |
| 1018 | BUILD NUMBER OF MODULE 126 | BUILD NUMBER OF MODULE 127 | | RESERVED | |
| 1024 | | | | | |

FIG. 5

METHOD FOR COMBINING PROGRAM DISKETTES IN AN INTERACTIVE TEXT PROCESSING SYSTEM

BACKGROUND OF THE INVENTION

The invention relates in general to interactive text processing systems and, in particular, to an improved method which reduces the amount of diskette handling required of the operator.

DESCRIPTION OF PRIOR ART

The prior art has disclosed a number of interactive text or word processing systems. Generally these systems comprise a display device, a keyboard, a microprocessor, a printer, and one or more diskette drives. The function of the diskette drive is to transfer to the volatile memory of the microprocessor one or more programs which interrelate the various hardware components of the system and which permit one or more text processing applications to be run on the system.

Some systems include a modem device for communicating with other word processing or even data processing systems. Most systems provide the operator with a displayed "menu" from which one or more selections can be indicated by the operator merely by typing a character or symbol on the keyboard and activating an "enter" key. Depending on the character entered into the system, the microprocessor may display a further "menu". The process is repeated until all of the data required by the system to perform a desired text processing task has been entered into the system.

One part of the program which has been entered into the system from the diskette is concerned primarily with establishing the normal interaction of the various components of the system. For example, a subroutine will normally provide for taking the signals represented by a single keystroke and transferring that byte of data to the microprocessor. Another subroutine will cause the character to be displayed on the screen at a location specified by the display cursor. Subroutines and programs which provide such functions are generally referred to as system control programs, whereas the programs that are unique to a particular text processing application, such as the creation of a document, are referred to as application programs.

As basic text processing systems have become more widespread and the number of installations have increased, the ability to economically support new application programs directed to features which enhance the basic program have improved to the point that for most text processing systems that are presently installed, a large number of different feature programs, language dictionaries and options are available and new feature programs and dictionaries become available on a regular basis.

The manner in which these new feature programs are introduced into the marketplace and the manner in which updates to existing programs reflecting corrections are handled, result in an increase in the amount of diskette handling required by the operator and is the cause for concern that errors will occur and efficiency will decrease in proportion to the number of diskettes that are required. In addition, the proliferation of feature diskettes and language dictionary diskettes add to the level of confusion for the unskilled operator.

The problem originates primarily in the system hardware because most early systems had a diskette drive that operated with a diskette cartridge which recorded on only one side of a disk. Subsequently, diskette drives and cartridges were marketed in which the amount of data stored on one side of the diskette was doubled. More recently, diskette drives and cartridges have been marketed in which both sides of the diskette are recorded at a double density, resulting in a storage capacity approximately four times the capacity of the original diskette.

Since each new feature program is generally separately priced, the industry has found it expedient to record only one feature program on a diskette along with the necessary control program for getting the program into the system to display its various menus, etc, and to interact with the basic text processing program.

The result is that the operator winds up with one diskette for each feature and where the text processing task being run by the operator utilizes a number of these features, considerable time is spent by the operator in changing diskettes. For example, assume in addition to the basic text processing program, the operator is provided with three additional feature programs on three separate diskettes. Assume for example, that one program provides the communication function to be done by the operator interactively with the system. That feature provides the ability to communicate with another terminal specified by the operator. Another diskette contains a program for recording the typed text on magnetic cards which then can be played out on magnetic card typewriters. The third diskette contains the third feature program which allows the operator to establish data processing type files, such as a name and address lists.

If the memory of the microprocessor was capable of storing all the data on the three diskettes, then there would be no major problem. However, this is technically not economical in that volatile memories which operate at the speed of the microprocessors in reading and writing data are currently much too expensive for the amount of data that must be stored. The operator is, therefore, faced with the problem of changing programming diskettes as the various program applications are required in any text processing application that is being run. The problem becomes even more complex when the system has only one diskette drive which must share the work diskette with the program diskette.

SUMMARY OF THE INVENTION

The present invention is directed to a method to reduce the amount of diskette handling by the operator by creating one new diskette which combines the programming and other data desired by the operator from a number of separate diskettes.

The method involves displaying to the operator a menu which reflects all processing tasks that the system is capable of performing. The menu is displayed as a result of reading an IPL program into the system along with a "combine" program which displays the menu and which guides the operator through a series of diskette insertions and removals. Depending on the various processing tasks that the operator selects from the menu, programs are transferred to a two-sided, double-density (2S2D) destination diskette from a one-sided, single-density (1S1D) source diskette. In addition to transferring the specific task programs from the various source diskettes to the destination diskette, information that had previously been entered into the system by the operator and stored on the individual source diskettes, for example, format and setup information for certain type documents is also transferred to the S2D destination diskette from the 1S1D source diskettes.

It is, therefore, an object of the present invention to reduce the number of diskette changes required by an operator of an interactive text processing system during use of the system.

A further object of the present invention is to provide a method for the operator of an interactive text processing system to combine programs on one diskette, selected from word processing tasks and feature programs which are stored on a plurality of different diskettes.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 5 illustrates a data set directory for a program stored on the diskette;

DESCRIPTION OF THE PREFERRED EMBODIMENT

Figure 1:
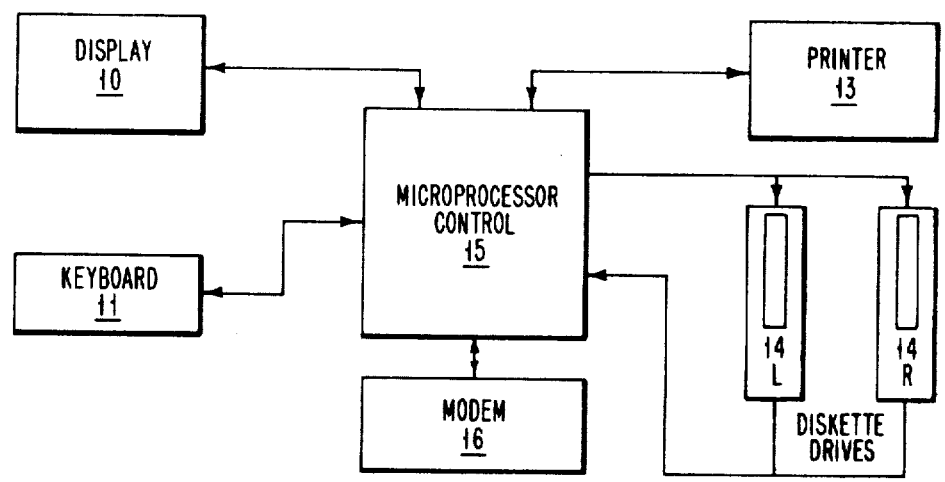
FIG. 1 is a functional block diagram of an interactive text processing system.

With reference to FIG. 1, a typical interactive text processing system is illustrated in which the method of the present invention is advantageously employed. The major components of the system shown in FIG. 1 comprise the display device 10, the keyboard 11, the printer 13, the diskette storage devices 14L and 14R, and the microprocessor 15 which includes an internal memory for storing programs and data entered from the keyboard 11 or from the diskette storage devices 14L and 14R. Device 14 functions to store data on either a single-sided diskette at density D1 only or to store data on a two-sided diskette at double density D2. The 2S2D diskette, therefore, can store approximately four times the information stored on the 1S1D diskette. A modem 16 is also shown in FIG. 1 and functions to permit the system to communicate with other similar text processing systems or to a data processing system.

Figure 2:
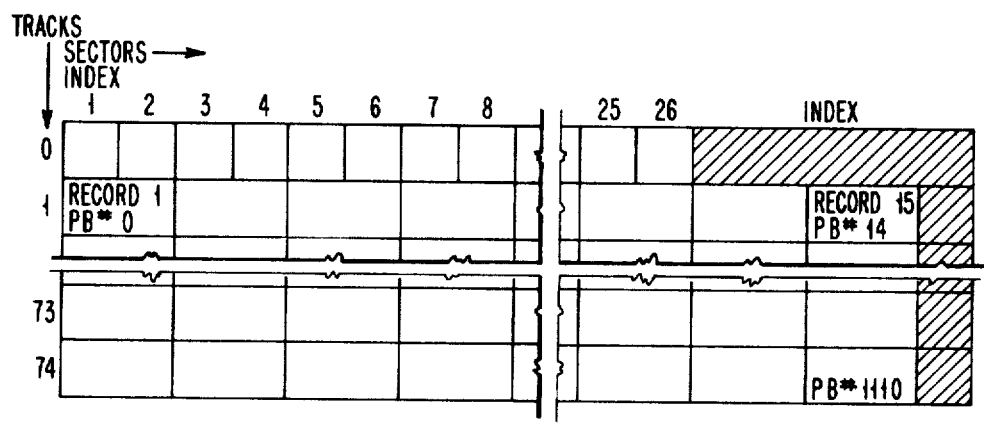
FIG. 2 is a table illustrating the general layout of diskettes employed in the system shown in FIG. 1.
Figure 3:
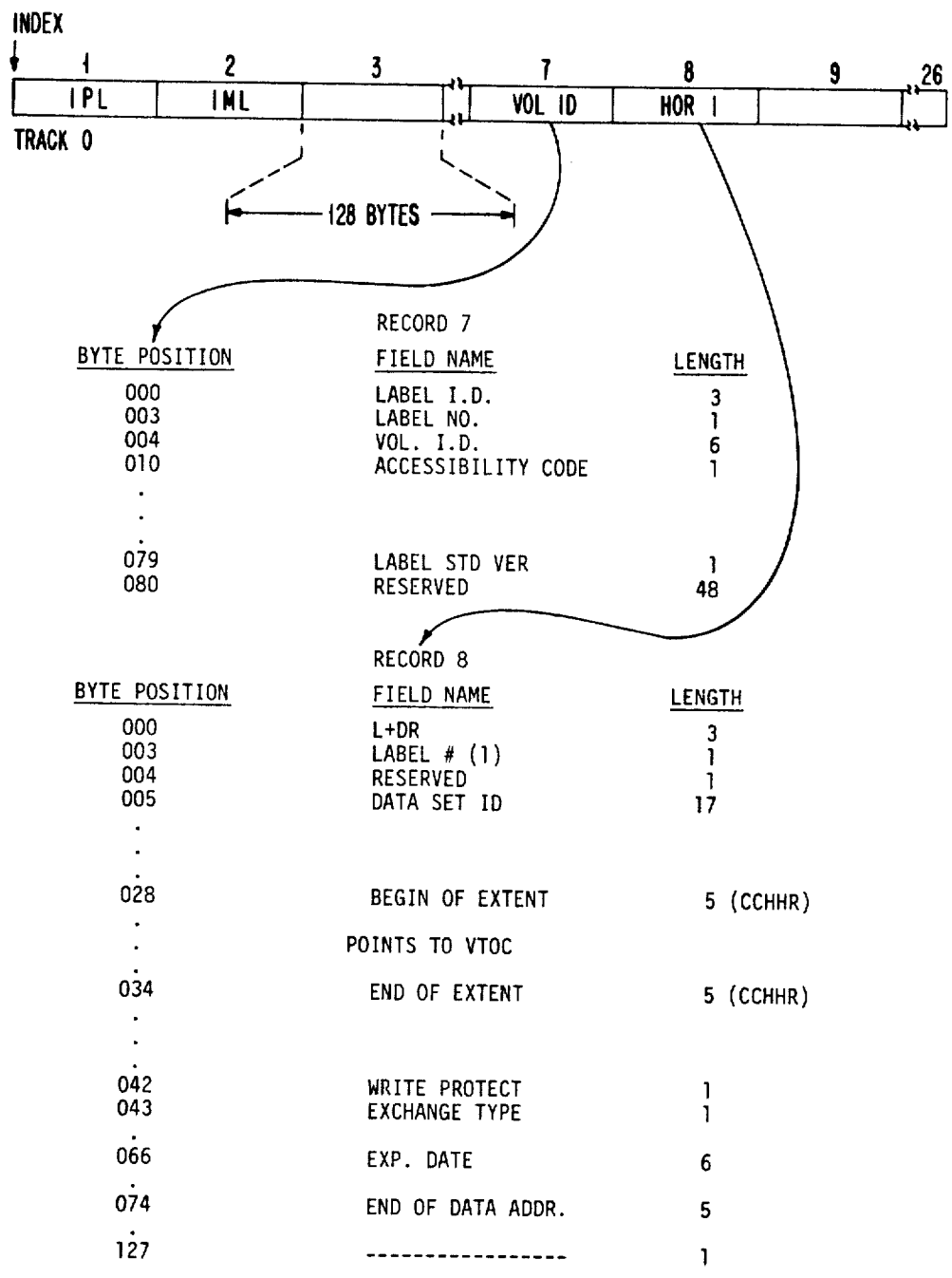
FIG. 3 illustrates the format of track 0 of the diskette shown in FIG. 2.

The general format on both types of diskettes is standard for a given system manufacturer to insure data interchange among like systems and is shown in FIG. 2. The IBM Standard for Word Processing Diskettes published by the IBM Corporation, Armonk, New York under the title Diskette 1, 2 and 2D OEMI Manual, publication number G-A-21-9388, provides a very detailed description of the format. According to that standard, each diskette is provided with tracks labelled 0 through 74. Tracks 1 through 74 are available for user data. Track 0 is reserved for system use, while two tracks, 75 and 76, are available as alternates and normally are not used. As shown in FIG. 2, physical records 1 and 2 of track 0, corresponding to sectors 1 and 2, are reserved for the Initial Program Load (IPL) and the Initial Microcode Load (IML) functions. Record 7 on track 0 is the volume 1 label, while records 8–26 are reserved for data set header labels. All sectors on track 0 are 128 byte sectors. Record 8 is a standard header label and, as shown in FIG. 3, includes bytes 28–32 representing a 5-character field defining the beginning address of the volume table of contents (VTOC). The beginning address field is formatted as a 2-byte cylinder field, a 2-byte head number, and a 1-byte record number referred to generally in the art as the CCHHR addresses. The end of VTOC is defined by another 5-character field CCHHR in bytes 34 through 38 of record 8 of track 0. The format of track 0 is the accepted standard for diskettes.

Figure 4:
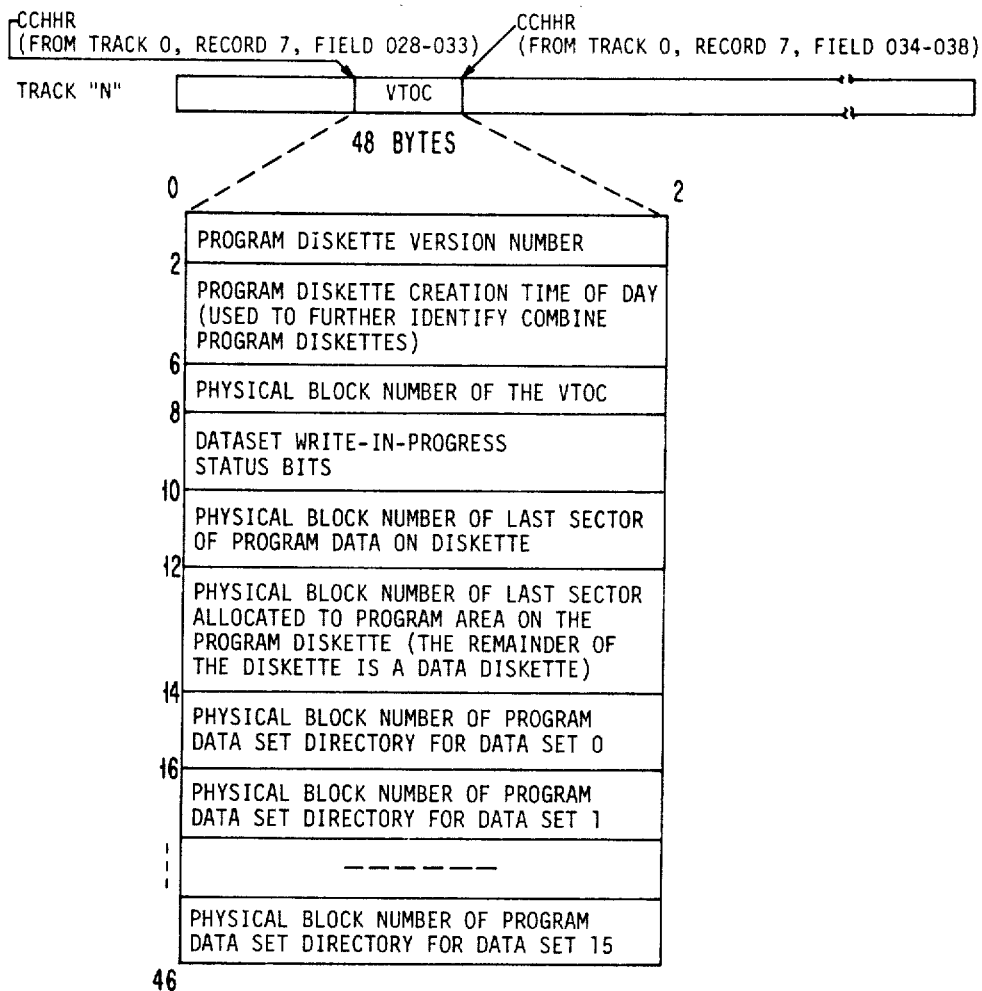
FIG. 4 illustrates the volume table of contents (VTOC) for a typical diskette employed in the system of FIG. 1.

The volume table of contents VTOC is constructed by the using system and, in this instance, is a table similar to FIG. 4 which contain a 2-byte pointer to the start of the storage location of each of 16 data set directories. The VTOC table also includes other relevant data about the diskette. As is conventional, the 2-byte pointer in VTOC to each data set directory is based on a physical block number PBN which is assigned sequentially to sectors beginning at track 1, sector 1 (physical block 0) through track 74, sector 15 (physical block 1110), as shown in FIG. 2. All sectors on tracks 1–74 are 256 bytes.

FIG. 5 illustrates the format of a data set directory. Each directory includes a pointer to each program module assigned to the data set. A data set is, therefore, just a collection of related program modules, which collection does not exceed 127 modules. The programs stored on the diskettes are divided among 16 different data sets where each data set represents a particular program function so that each module assigned to that data set performs a similar program function. Some modules contain tables of data as distinguished from instructions.

The system, as shown in FIG. 1, is activated by the operator turning on the power and inserting a basic text processing program diskette into one of the diskette drives 14L or 14R. The basic program diskette is an 1S1D type diskette and, since an 1S1D type diskette can be read by either device, either device may be used. The system automatically reads the appropriate sector of track 0 to initialize the system. This involves reading into the memory of the microprocessor the IPL program and programs for displaying menus and programs for causing the system to perform the tasks indicated by the menus or for directing the operator to other diskettes when the programs to accomplish the selected tasks are not on the operating diskette. After the system has been initialized, a task selection menu is displayed to the operator on display device 13 similar to the following.

| MENU 1 | | |
|---|---|---|
| PRODSK | | Kyb 1 |
| TASK SELECTION | | |
| ID | ITEM | |
| a | Typing Tasks: Create, Revise or Paginate Documents | |
| b | Work Diskette Tasks: Delete or Duplicate Documents, Files, or Setups Duplicate, Condense or Erase/Initialize (Name Diskette Print Index of Diskette Contents, | |

-continued

| MENU 1 | | |
|---|---|---|
| PRODSK | | Kyb 1 |
| | c | Change Document or Diskette Name, Recover Documents, Files and Setups Program Diskette Task: Default Formats, Duplicate Setups and Spelling Supplement Printer and Workstation Description, Duplicate and Erase Program Diskette Feature Program Diskette Tasks Create and Update Combined Program Diskette |
| | d | Spelling Tasks |
| | e | Feature Tasks |
| | f | Merge Tasks |

(Instruction Line)
Type ID letter to choose ITEM; press ENTER:
(Message Line)

The top line of the menu contains a number of fields. The first field, for example, defines the name of the diskette, while other fields will be used to portray to the operator conditions of the system. The bottom two lines of the menu are a prompt line, and a message line respectively, which function as their names imply.

The tasks available to the operator and performed by the system, as shown in Menu 1, will now be described in a general sense to provide a basis for understanding the method of the present invention. Prior to such description, it should be recognized that the operator has available a number of diskettes. One group of diskettes will be program diskettes, a second group will be work diskettes, and a third group will be new blank diskettes which are blank except for the initialization information and formatting data that was recorded on the diskette at the factory.

Further, if the system has only one diskette drive which only operates with a 1S1D type diskette, all of the diskettes referred to above will be of the same density type, namely, 1S1D.

If, however, the system includes a 14L and a 14R 2S2D type diskette drive, then the operator will probably have two types of diskettes, i.e., a single and double density diskettes.

In addition, it should be understood that the operator will have two different types of program disks. One type of program disk is to the basic set of tasks that the system performs, while the other type of program disks are to specific features. It should be understood that only the basic program diskette has its own IPL program so that the operator may not insert a feature program diskette directly when the feature task is to be performed. The main program, however, will prompt the operator to insert and remove the feature diskette at the appropriate time in accordance with the interactive entry of data into the system in accordance with selected menu options.

The tasks that the operator may select are displayed on the display device as a result of the IPL operation. The function of these tasks are as follows:

Typing Task. This task is primarily concerned with the creation, revision or reformatting of documents that have been entered into the system. If the operator selects the typing tasks option in the task selection menu, then the typing task program set is loaded into the system from the diskette. If the appropriate program diskette has been taken out or is not in the work station diskette drive when this menu is displayed and the option selected, the system will display a message to the operator on the prompt line advising the operator to insert the particular diskette. After the typing task program set is loaded, the typing task selection menu is displayed, which resembles the following menu.

| MENU 2 | | |
|---|---|---|
| DSK001 | | Kyb 1 |
| TYPING TASKS | | |
| ID | ITEM | |
| a | Create Document | |
| b | Revise Document | |
| c | Paginate Document | |
| d | Paginate, Hyphenate, Spell Check Document | |
| e | Go to Task Selection | |

When finished with this menu, press ENTER.
Type ID letter to choose ITEM; press ENTER:
(Message Line)

Depending on the operator's response to this menu, a message to insert an appropriate work diskette will be displayed.

Work Diskette Tasks. A work diskette task is primarily directed to the maintenance of work diskettes and their contents. A work diskette is a diskette on which documents are stored, for example. If the operator selects the work diskette task option in the task selection menu (Menu 1), the work diskette task program set is loaded into the system. As before, if the program diskette has been removed from the system, the system will prompt the operator to reinsert the program diskette. After the work diskette task program set has been loaded, the following menu is presented to the operator.

| MENU 3 | | |
|---|---|---|
| DSK001 | | Kyb 1 |
| WORK DISKETTE TASKS | | |
| ID | ITEM | |
| a | Delete Document | |
| b | Duplicate Document | |
| c | Change Document Name | |
| d | Change Diskette Name | |
| e | Duplicate Diskette | |
| f | Condense Diskette | |
| g | Erase or Initialize (Name) Diskette | |
| h | Recover Documents | |
| i | Print Index of Diskette Contents | |
| j | Go to Task Selection | |

(Instruction line)
(Prompt line)
(Message line)

Program Diskette Tasks. When the program diskette task option is selected on Menu 1, the system response will be to prompt the operator to insert the appropriate program diskette. After the diskette is inserted, it is checked to insure it has the correct maintenance level, menu language, etc. If the check is satisfied, the program diskette task program set is loaded into the system. This set of tasks is directed primarily to maintenance of program diskettes and their contents. When the program diskette tasks selection set has been loaded into the system, a program diskette task selection menu such as the one shown below is displayed to the operator.

| MENU 4 | |
|---|---|
| PRODSK | Kyb 1 |
| TEXTPACK PROGRAM DISKETTE TASKS | |

-continued

MENU 4
PRODSK                                         Kyb 1

| ID | ITEM |
|---|---|
| a | Change Document Format Defaults |
| b | Change Alternate Format Defaults |
| c | Change Printer Description |
| d | Change Work Station Description |
| e | Duplicate Machine Setup |
| f | Duplicate Program Diskette |
| g | Erase Program Diskette |
| h | Duplicate Spelling Supplement |
| i | Change Arithmetic Format Defaults |
| j | Create New Combined Program Diskette |
| k | Update Combined Program Diskette |
| l | Go to Task Selection |

When finished with this menu, press ENTER.
Type ID letter to choose ITEM; press ENTER:
(Message Line)

If a feature program diskette is loaded, then the specific program diskette task selection menu on that feature diskette is displayed after the feature program task set is transferred into the system. The menu details will depend on the feature.

Spelling Tasks. If the operator selects the spelling tasks option from the task selection menu (Menu 1), the spelling tasks program set is loaded into the system. As before, a message will be provided to the operator if the program diskette had been removed. The primary function of the spelling task is to check the spelling of words in a document. After the program set has been loaded into the system, the spelling task selection menu shown below is displayed to the operator.

MENU 5
DSK001                                       Kyb 1

SPELLING TASKS

| ID | ITEM |
|---|---|
| a | Check Document |
| b | Load Supplement |
| c | Clear Supplement |
| d | Store Supplement on Program Diskette |
| e | Choose Spelling Language Dictionary |
| f | Paginate, Hyphenate, Spell Check Document |
| g | Go to Task Selection |

When finished with this menu, press ENTER.
Type ID letter to choose ITEM; press ENTER:
(Message Line)

Feature Tasks. The function of the feature tasks option is to provide a mechanism whereby the operator may select certain specific operations to be performed in the system. Each of these operations will be on a separately distributed feature diskette and, hence, the response to the operator selecting the feature task option on the task selection menu (Menu 1) will always be to insert the appropriate feature diskette. After the feature program diskette has been loaded, it is checked to insure that it has the correct maintenance level and menu languages. The specific feature task selection menu on that feature diskette is displayed after the feature program task set is transferred to the system. The menu will depend on the specific feature.

The above description of the insertion and removal of diskettes is merely an example of the type of problems that the present invention is directed to. It will be appreciated that as new features are added to the system where each is on a separate 1S1D diskette, considerable time can be wasted changing from one program diskette to another. This is especially true in systems where only one diskette drive is employed and the program diskette cannot be used as a work diskette also.

It should also be understood that, for a number of reasons, the basic text processing program might have four or five different capability levels, where each level offers the user more basic functions than the previous level. The decision to package a new function as another version or level of the basic program or as a separate feature will depend more on marketing criteria than on technical considerations.

Since the device 14 can read both 1S1D and 2S2D diskettes, considerable improvement in the throughput of the system will be obtained by transferring those individual feature programs that are used most often by the operator from the feature 1S1D diskettes to the 2S2D diskette along with the basic program so that the system can be initialized from the combined 2S2D diskette and the desired subset of tasks and functions can be accomplished without changing diskettes as the tasks are completed.

In the following description of the preferred embodiment of the improved method, the various programs are combined onto the 2S2D destination diskette in accordance with a "Combine" program that is entered into the system from a 1S1D source diskette which, in practice, has been packaged as part of the highest version of the basic program. This program guides the operator interactively through a sequence of menus from which selections are made, and also prompts the operator to insert and remove specifically identified 1S1D diskettes at the appropriate time so that task program sets corresponding to the tasks selected from the displayed menus will be transferred to the 2S2D destination diskette and so that the appropriate housekeeping data will also be generated by the system and stored on the 2S2D diskette so as to permit the transferred programs to be subsequently selected and entered into the system from the single 2S2D combined program diskette.

The 2S2D combined program diskette also will be used as a work diskette since, from a practical standpoint, the subset of selected task programs for a given text processing application will, in all probability, leave considerable amount of working storage space on the 2S2D combined diskette.

Figure 6:
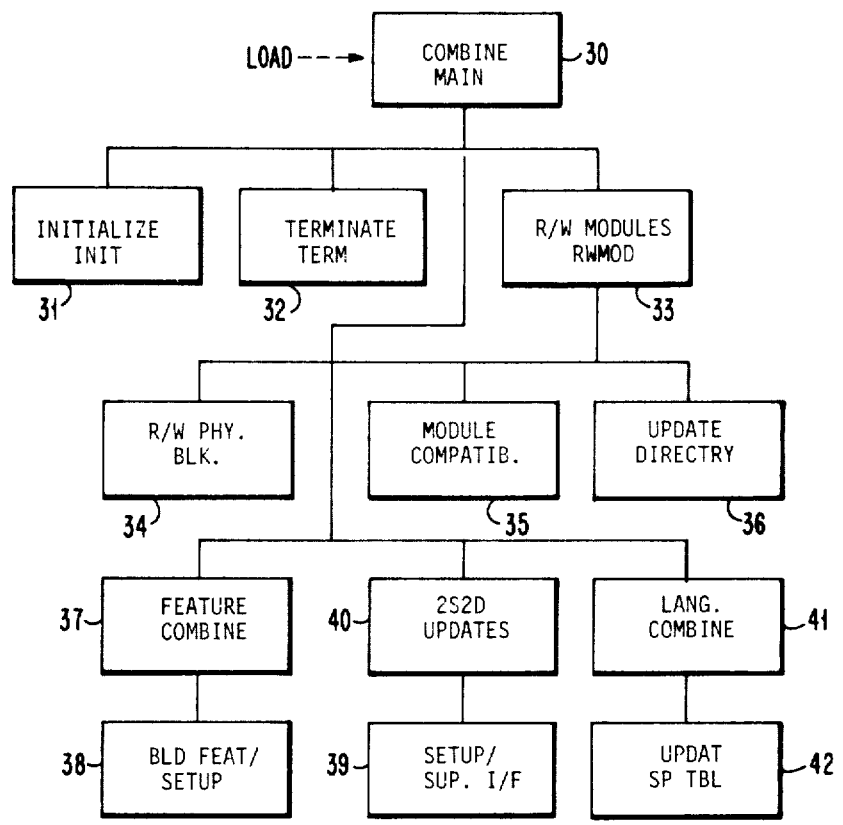
FIG. 6 is a chart illustrating the program architecture for the program being run by the microprocessor.

FIG. 6 illustrates the various subroutines of the "Combine" program. The "Combine" main subroutine 30 functions to control the flow of operations between the system program and the various subroutines associated with the "Combine" program. The "Combine" program is executed by the system while the textpack or basic program diskette task selection menu is displayed. A copy of the menu follows.

MENU 6
PRODSK                                         Kyb 1

TEXTPACK PROGRAM DISKETTE TASKS

| ID | ITEM |
|---|---|
| a | Change Document Format Defaults |
| b | Change Alternate Format Defaults |
| c | Change Printer Description |
| d | Change Work Station Description |
| e | Duplicate Machine Setup |
| f | Duplicate Program Diskette |
| g | Erase Program Diskette |
| h | Duplicate Spelling Supplement |
| i | Change Arithmetic Format Defaults |
| j | Create New Combined Program Diskette |
| k | Update Combined Program Diskette |

-continued

| MENU 6 | |
|---|---|
| PRODSK | Kyb 1 |
| 1 Go to Task Selection | |
| When finished with this menu, press ENTER. | |
| Type ID letter to choose ITEM; press ENTER: | |
| (Message Line) | |

The j option, "Create", is the subject of the present application. The "Update" option is described and claimed in copending application Ser. No. 311,113, M. G. Advani et al, filed concurrently herewith and assigned to the assignee of the present invention.

When the operator selects option j from the menu, the "Combine" program is read in and the system branches to the "Combine" program. The overall function of the "Combine" program is to first make a logical copy on the 2S2D diskette of all of the programs that reside on the basic program diskette, which may include two diskettes, then transfer programs from selected 1S1D feature diskettes to the 2S2D diskette, then selected language programs from the language diskettes. The term "logical copy" implies a copy of the contents from the source diskette to the destination diskette, but not necessarily to the same physical location or logical address.

Some of the tasks that are executed by the initialize subroutine 31 include the establishment of various work buffers in RAM, the assignment of memory for control blocks, and the establishment of the volume table of contents VTOC for the destination diskette. The functional block 32, "Terminate", performs certain functions at the close of the "Combine" program which converts the destination diskette into a valid program diskette. Some of these functions include the storing of the VTOC table as it has been built up in memory on the destination diskette and the transfer of various tables which were built in memory reflecting the various programming modules that have been transferred from the source diskettes to the destination diskette, which are generally referred to as housekeeping tasks.

The next block 33 of the "Combine" program is the R/W module whose function is to control the transfer of program data as stored on the source diskettes into memory and the subsequent transfer of program data from the memory to the destination diskette.

The R/W physical block subroutine 34 functions to write or read addressed physical blocks of the source and destination diskettes.

The block 35 labelled "compatible" determines when a program module on a source diskette is to replace a similar program module on a destination diskette. This subroutine is employed to insure that the latest version of the module, i.e., highest build number, is recorded.

The subroutine functional block 36 labelled "update directory" functions to update a destination data set directory as modules are being transferred from the source diskette to the destination diskette.

The "feature combine" functional block 37 subroutines function to display to the operator features that may be combined and also to control the transfer of the feature programs from the 1S1D source diskettes to the 2S2D destination diskette.

The "Build feature/setup" subroutine 38 operates in connection with the "Combine" feature subroutine to update various tables in memory which will eventually be transferred to the destination diskette.

The "2S2D update" subroutine 40 shown in FIG. 6 is not employed in the create combine task. It is the subroutine employed in connection with the update of setups, language supplements, and other data from the update task which is option k of menu 6.

The "language combine" routine 41 functions to present to the operator menus which solicit requests for languages to be transferred and their source.

The "update spelling table" subroutine 42 transfers a selected language module from the source diskette to the destination diskette and updates a table in memory (and, subsequently, on the combined program diskette) which will be used to indicate what language dictionaries are on the combined program diskette.

A number of other subroutines are shown in FIG. 6, and are employed in the process of combining programs. These are generally referred to as the "other service" programs.

The "Combine" program proceeds in a sequential fashion to transfer programs to the 2S2D diskette in the following order:

1. The basic text processing program is transferred to the 2S2D diskette as a logical copy.

2. The feature programs are transferred from separate feature diskettes in accordance with the features that have been selected by the operator.

3. The selected language programs and associated dictionaries are transferred to the 2S2D diskette in accordance with the particular languages selected by the operator.

The transfer of the basic text processing programs from the 1S1D source diskette to the 2S2D destination diskette is, in essence, a transfer of all program modules from one diskette to the other. A program module comprises 31 control sections (C-sects), each of which is represented by a 5-bit number. A 7-bit module index identifies each module, while a 4-bit data set identifier identifies one of 16 separate data sets. The basic program unit that can be transferred between a source diskette and a destination diskette is a module. The transfer process, therefore, involves identifying on the source diskette those modules that comprise the programs for the task set selected by the operator.

Since the "Combine" program per se is part of the basic program package which is represented by two 1S1D diskettes, all of these program modules are, in effect, merely transferred onto the 2S2D destination diskette from each of the 1S1D diskettes. The data set directories that were set up on basic program diskettes are not transferred to the "Combine" destination diskette at this time, but are maintained in memory until all the desired 1S1D diskettes have been transferred to the 2S2D diskette. In addition, all of the modules represented in the data set directories will also be recorded on the destination diskette, and their new locations will be placed in the appropriate data set directory.

A data set directory is only established if there is a data set to be recorded on the diskette. In other words, there is not necessarily 16 data set directories on each diskette since the programming modules which comprise the basic programs may not require the establishing of 16 separate data sets. More likely, only half that number of data set directories would have been established for the programming modules for the basic tasks. Further, it should be understood that in each established data set directory, the allocation of modules to the directory results in a very sparsely populated directory in that perhaps only ten of the possible 127 module directory positions in any data set will be occupied by the programs for the basic text processing tasks.

The following table represents a hypothetical distribution of program modules among data sets for the basic text processing programs, the feature programs, and the eight language dictionaries.

TABLE 1

| Data Sets Programs | 0 | 1 | 2 | 3 | 4 | 5 | ... | 13 | 14 | 15 |
|---|---|---|---|---|---|---|---|---|---|---|
| Basic | 6 |  |  | 9 | 10 |  |  | 11 | 18 | 7 |
| Feature 1 | 3 |  | 5 | 10 |  | 4 |  | 2 |  | 1 |
| Feature 2 | 3 |  | 12 | 4 |  | 4 |  | 2 |  | 1 |
| Feature 3 | 3 | 8 |  | 2 |  |  |  | 4 |  | 12 |
| Language 1 | 1 | 2 | 4 |  | 8 | 2 |  |  | 10 | — |
| Language 8 | 3 |  | 5 | 2 | 7 | 2 |  |  |  | — |

After the basic or text pack programs have been transferred to the 2S2D diskette, the feature programs which have been selected by the operator will then be transferred. Since each feature program is on a separate 1S1D diskette, all of the programming modules that are recorded on that feature diskette will be transferred to the 2S2D diskette. However, the transfer process is slightly different than that previously employed in making the logical copy of the basic programs. In transferring feature program modules to the 2S2D diskette, those modules assigned to the first data set directory on the feature diskette are transferred first. Where a corresponding directory already exists in memory, that directory is updated. When none exists, the next free space on the diskette is preallocated for that data set directory and the modules for that data set are then transferred and recorded after the preallocated space.

The process described above is repeated for each of the features which has been selected.

The next major step in the combine process involves the transfer of selected language pack dictionaries from the language pack program diskettes to the 2S2D diskette. This transfer process is again slightly different than the logical copy process involved with the basic program modules or the feature program modules. The difference lies in the fact that only those programming modules associated with the selected language dictionary will be transferred from a given diskette. The selection process is established by the operator selecting a particular language from the language selection menu which, in effect, establishes a list of control sections and associated modules that are involved with the selected language dictionary. These modules associated with the selected language dictionary are then transferred in data set sequence to the 2S2D diskette and sequentially recorded, with the respective data set directories being updated as each module is transferred. Again, if the destination diskette does not include the required data set directory because a given programming module has a unique data set number, then space for a new directory is allocated on the 2S2D diskette and is immediately followed by the respective program modules assigned to that unique data set. That process is repeated for each language that is selected.

After the last data has been transferred, the "terminate" section 32 (FIG. 6) of the "Combine" program transfers the directories from the system memory to the 2S2D diskette and other predefined tables to permit the 2S2D diskette to be recognized by the system as a valid program disk.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. In an operator controlled interactive text processing system having a keyboard, display device, and a diskette drive for interactively entering programs into said system from a plurality of program source diskettes that are inserted individually into said diskette drive, said system performing test processing tasks that are selected by said operator interactively from menus which are displayed by said system to said operator from portions of said entered programs where said operator is required to insert said plurality of program source diskettes individually into said diskette drive whenever the desired text processing task to be performed by said operator requires a set of text processing task programs stored on different said program source diskettes, the method of combining a selected said set of said text processing task programs initially stored on said plurality of different program source diskettes onto one destination diskette to avoid said operator inserting and removing said plurality of program source diskettes into and from said diskette drive each time said operator controls said system to execute said set of selected text processing task programs, said method comprising the steps of entering into said system a "combine" program and executing said combine program to cause said system to combine on said one destination diskette text processing task programs from each of said separate program source diskettes that are selected in accordance with selection data that is entered into said system interactively by said operator in response to displayed menus which are entered into said system as part of said "combine" program and which display identifiable options corresponding to said text processing programs to be transferred to said destination diskette, entering said selected data into said system when said menus are displayed, and transferring to said destination diskette each said program identified to said system by said selection data.

2. The method recited in claim 1, further including the step of transferring other non-program type information from at least one of said program source diskettes to said one destination diskette in accordance with other selection data that is entered into said system interactively by said operator in response to said displayed menus.

3. The method recited in claim 2 in which said program source diskettes store said text processing task programs only on one side S1 at a bit density D1 and said transfer step transfers said text processing task programs and said non-program type information to both sides S2 of said destination diskette at a bit density D2 which is approximately twice the bit density D1.

4. The method recited in claim 3 in which said text processing task programs that are combined on said destination diskette include an IPL program, a basic text processing task program, a first plurality of feature programs, and a second plurality of spell-check programs for checking the correct spelling of words.

5. The method recited in claim 4 in which said step of transferring said non-program information includes transferring operator entered data that has been recorded on said at least one program source diskette as "setup" data and supplementary dictionaries.

6. The method recited in claim 5 in which said basic text processing task program and said "combine" program are transferred to said destination diskette as a logical copy prior to transferring any other said program to said destination diskette.

7. The method recited in claim 6 in which said step of transferring the basic text processing program as a logical copy includes transferring a plurality of programming modules, each of which has been assigned to only one of a plurality of data sets, and transferring a corresponding plurality of data set directories, each of which define the location on said destination diskette of the start of each transferred said module associated with said data set along with the length of said transferred module.

8. The method recited in claim 7 in which each said transferred data set directory is recorded on said destination diskette immediately preceding said programming modules assigned to said data set.

9. The method recited in claim 8 in which said step of transferring data set directories only transfers a said directory from said program source diskette if there is at least one programming module assigned to said corresponding data set.

10. The method recited in claim 9 further including the step of transferring feature programming modules from a feature program source diskette containing a selected feature program to said destination diskette, said feature programming module transfer step including first, transferring the said feature programming modules from said feature program source diskette to said destination diskette beginning with program modules which are assigned to the lowest order data sets while updating the corresponding said data set directories stored in said system and allocating space on said destination diskette for a new data set directory immediately following any feature programming modules previously transferred to said destination diskette, and recording all said transferred feature programming modules for that data set following said allocated space.

11. The method recited in claim 10 further including the step of transferring selected language modules and dictionaries from one of said program source diskettes to said destination diskette, said language module transfer step including first, transferring in data set order said language programming modules assigned to data sets having data set directories previously transferred to said destination diskette, allocating other data set directory space on said destination diskette, and transferring any remaining language programming modules to said destination diskette immediately following said other directory space.

12. The method recited in claim 1 further including the step of displaying to said operator predefined messages advising said operator when to remove and insert each said separate program source diskette.

13. The method recited in claim 11 further including the step of transferring any data set directory stores in said system to said previously allocated space on said destination diskette.

* * * * *